United States Patent [19]
Ludington et al.

[11] 3,716,119
[45] Feb. 13, 1973

[54] BRAKE MECHANISMS

[76] Inventors: Robert L. Ludington, 3419 Manitou Tr.; Robert M. Holloway, 921 North Roeske Trail, Pottawattomie Country Club Estates, both of Michigan City, Ind. 46360

[22] Filed: March 23, 1971

[21] Appl. No.: 127,277

Related U.S. Application Data

[63] Continuation-in-part of Ser. No. 1,266, Jan. 7, 1970, Pat. No. 3,612,230.

[52] U.S. Cl. .................................188/195, 303/23 R
[51] Int. Cl. .................................................B60t 8/20
[58] Field of Search......................188/195; 303/23 R

[56] References Cited

UNITED STATES PATENTS

2,361,087  10/1944  Cook....................................188/195
3,608,680   9/1971  Beacon................................188/195

*Primary Examiner*—Duane A. Reger
*Attorney*—Brooks, Haidt & Haffner

[57] ABSTRACT

A load compensating unit for modifying the braking force applied to the brakes of a railway car depending on the load on the car comprising a housing, a rod slidable with respect thereto, a spring acting therebetween to transmit force from one to the other and a pawl for locking the housing and rod rigidly together under control of a cable actuated in accordance with the spacing between the car truck bolster and car frame and hence, with the car load. The load compensating unit is connected to and determines the amount of movement of a lever in the brake rigging upon application of the brakes and may be between the brake cylinder and the lever normally operated by the brake piston rod.

16 Claims, 16 Drawing Figures

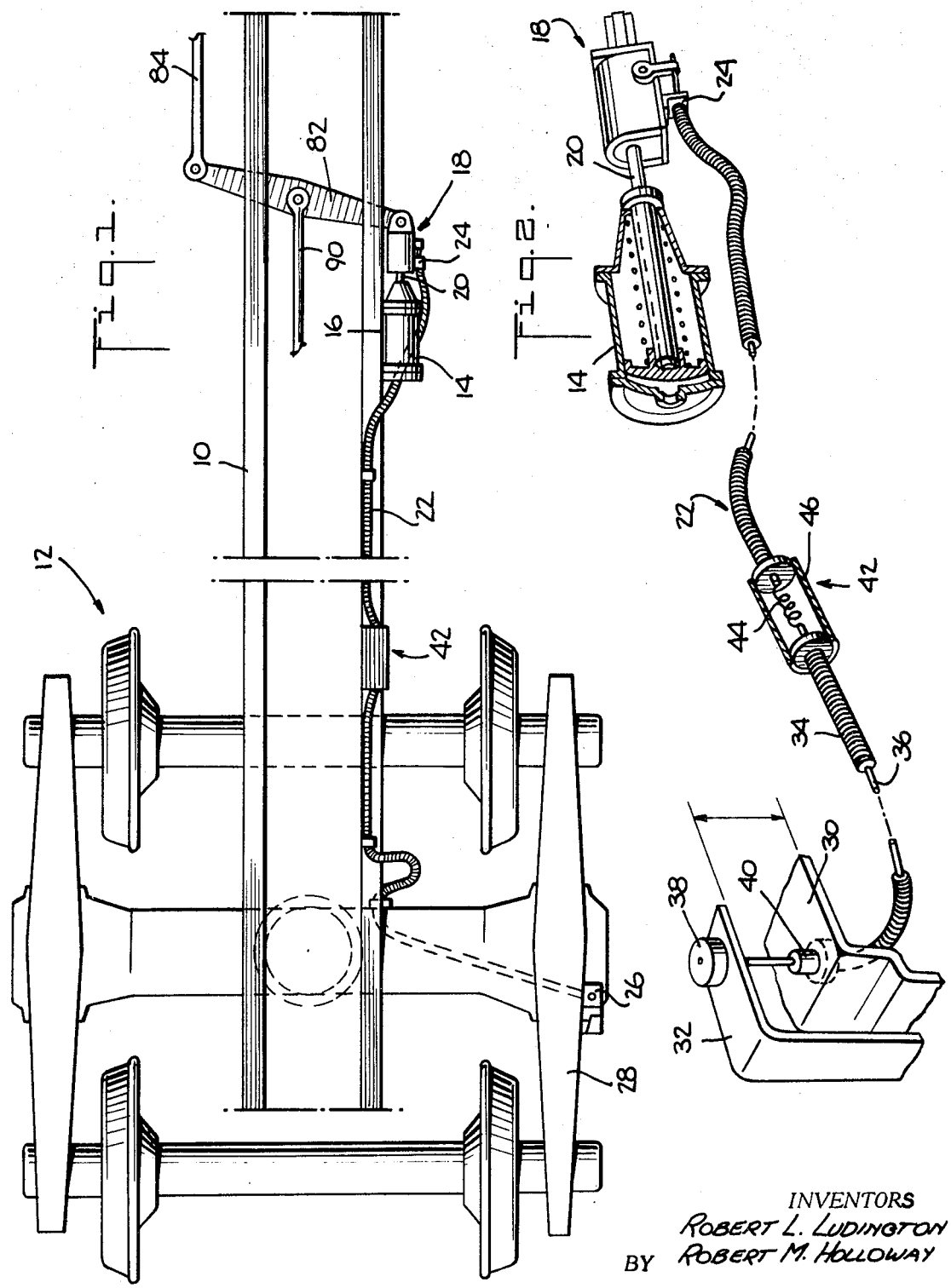

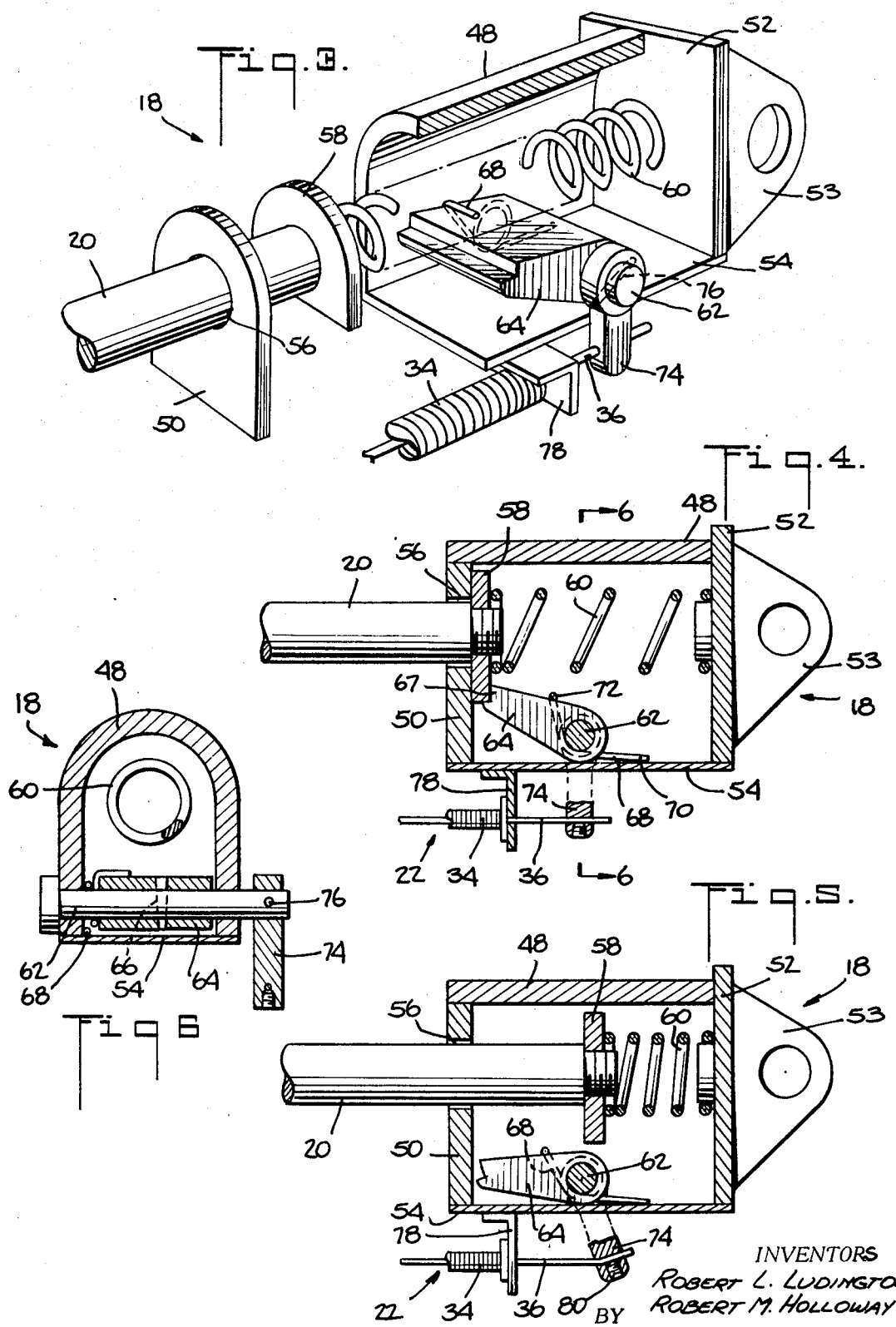

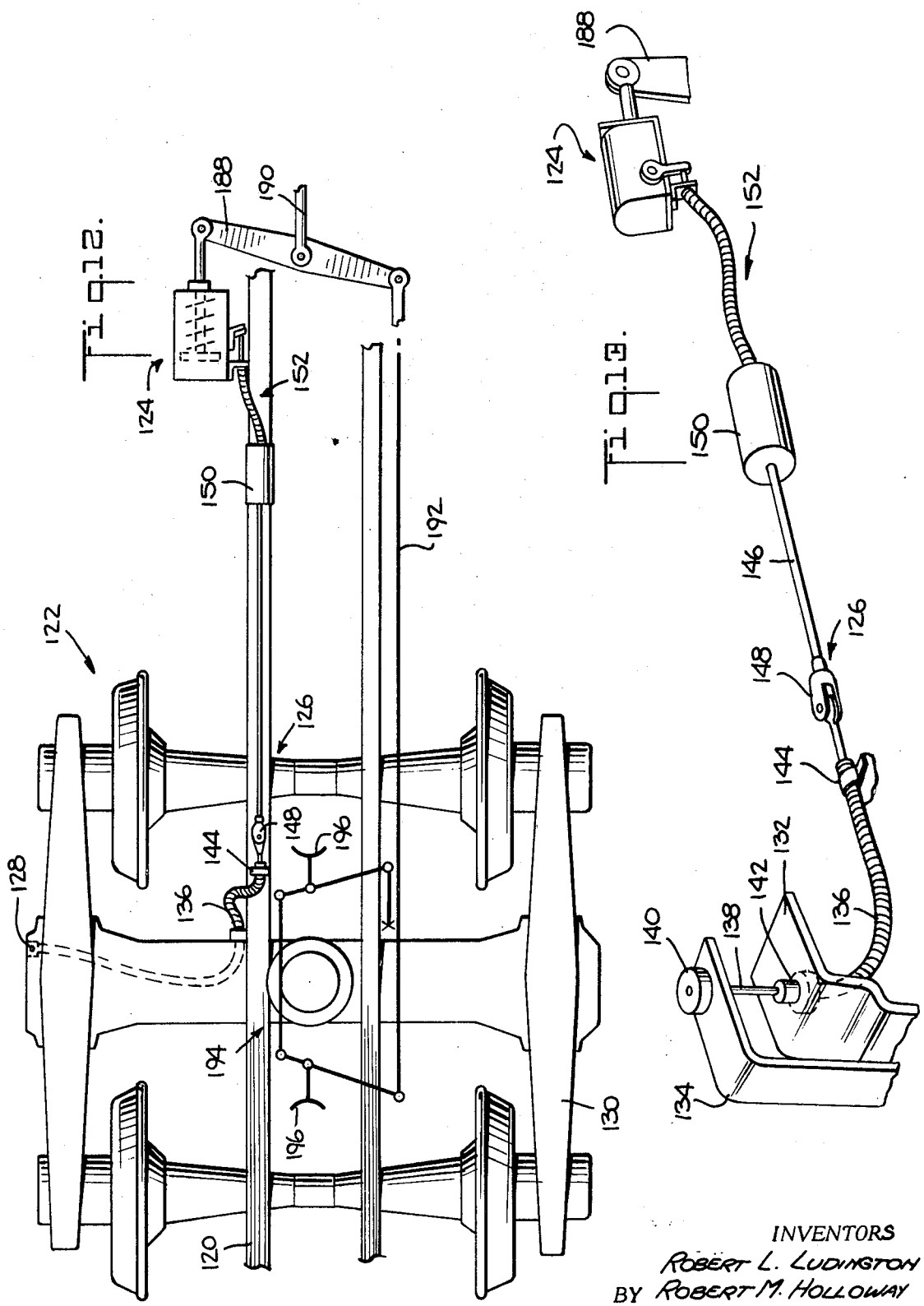

INVENTORS
ROBERT L. LUDINGTON
BY ROBERT M. HOLLOWAY

Ward McEllannor Brooks Fitzpatrick
ATTORNEYS

BRAKE MECHANISMS

This application is a continuation-in-part application of our copending application Ser. No. 1,266 filed Jan. 7, 1970, now U.S. Pat. No. 3,612,230.

This invention relates to brake mechanisms and, more particularly, to empty and load brake mechanisms for vehicles.

The brake mechanism according to this invention is particularly adapted, among other possible applications, for use on standard railway cars such as are now widely in use on American, Mexican and Canadian railways. The brake mechanisms according to this invention may be used as new or original equipment on the railway cars, or they may be used as replacements or attachments to brake mechanisms presently in operation.

Heretofore, considerable difficulty has been experienced due to the fact that the usual brake mechanisms constructed in accordance with the prior art concepts resulted in over-braking empty railway cars and under-braking loaded railway cars. Some cars were built so that the empty car weight was increased in order to keep from using certain prior art empty and load brake equipment. It is an object of the present invention to overcome the difficulties which were inherent with the usual prior art mechanisms.

Another object of this invention is to provide a new and improved braking mechanism which provides a variable braking force depending upon the load being carried by the car and which can be used with standard railway brake mechanisms.

The performance of railway equipment used in the United States is specified by the rules of the Association of American Railroads. The rules of such Association, effective Jan. 1, 1969, include the following Rule 3(b)(A:

"Braking Power: All freight cars built new or rebuilt prior to Jan. 1, 1965, offered in interchange, having metal brake shoes, shall have a nominal braking ratio of not less than 50 nor more than 75 percent of the empty car weight, based on a brake cylinder pressure of 50 lbs. per square inch, except refrigerator cars equipped with cast iron wheels which shall have a nominal braking ratio of not less than 50 nor more than 60 percent of the empty car weight based on 50 lbs. per square inch brake cylinder pressure. In interchange.

All freight cars built new or rebuilt on and after Jan. 1, 1965, offered in interchange, having metal brake shoes, shall have a nominal braking force of 75 percent of the empty car weight or as close thereto as possible, but in no event to exceed 80 percent of the empty car weight, and not less than 18 percent nor more than 35 percent of the gross rail load, based on a brake cylinder pressure of 50 lbs. per square inch. In interchange."

Accordingly, it is essential that all new or rebuilt freight car braking systems comply with this requirement. In order to comply, some prior art braking systems employed one cylinder-piston assembly of one size and a second cylinder-piston assembly of a different size. That is, one cylinder-piston assembly was employed for a loaded car condition and the other cylinder-piston assembly was used when the car was empty. Under certain conditions both cylinders were used and two reservoirs of air had to be used which was costly in fabrication as well as consuming more air than was required with conventional equipment. This dual system was complicated and expensive to fabricate. Another prior art system employed a single piston and cylinder assembly wherein air pressure was exerted against the front of the piston only when the car was loaded and air pressure was exerted against the front and a portion of a back of the piston when the car was empty. This system worked to some extent, but it required a complicated and expensive piston and cylinder piping arrangement. It will be appreciated that air piping on a railroad car has certain disadvantages not only because of the expense and difficulty of installation thereof but also care must be exercised to eliminate any low spots in the piping where water can accumulate and, in Winter, freeze, thereby plugging the air line. Also, large volumes of additional air were required for prior art mechanisms.

In the system described in U.S. Pat. No. 3,335,825, of which we are co-inventors, a compound fluid piston was used which had a first stroke length with one piston diameter and a second stroke length with the second piston diameter. This system is very effective for many installations. The present invention concerns improvements thereover.

The present invention involves a novel combination of features combined in such a way as to afford a very efficient solution to the difficulties encountered with the prior art braking system, as will become apparent as the description proceeds.

Railway cars have a stationary truck side frame and a truck bolster mounted for vertical movement, the vertical position being determined by the load carried by the railway car. The braking apparatus of the invention comprises a load compensating unit mounted in the brake rigging which includes a housing connected to the brake rigging, and a rod connected to the brake rigging. Spring means are interposed between the housing and the rod, and means are provided for locking the rod with respect to the housing when the railway car is substantially loaded.

Several preferred embodiments of the invention have been chosen for purposes of illustration and description, and are shown in the accompanying drawings, forming a part of the specification wherein:

FIG. 1 is a fragmentary, schematic, plan view of a railway car having a braking apparatus according to the invention mounted thereon;

FIG. 2 is a schematic perspective view of the braking apparatus constructed in accordance with the invention;

FIG. 3 is an enlarged, exploded, perspective view of a load compensating unit;

FIG. 4 is a vertical, medial, sectional view of the load compensating unit of FIG. 3;

FIG. 5 is a vertical, medial, sectional view of the load compensating unit similar to FIG. 4 but showing the unit in a second operative position;

FIG. 6 is a transverse sectional view of the unit taken along the line indicated at 6—6 in FIG. 4;

FIG. 12 is a fragmentary, schematic, plan view of a railway car having a braking apparatus according to another embodiment of the invention mounted thereon;

FIG. 13 is a schematic, perspective view of the braking apparatus of FIG. 12;

Figure 7:
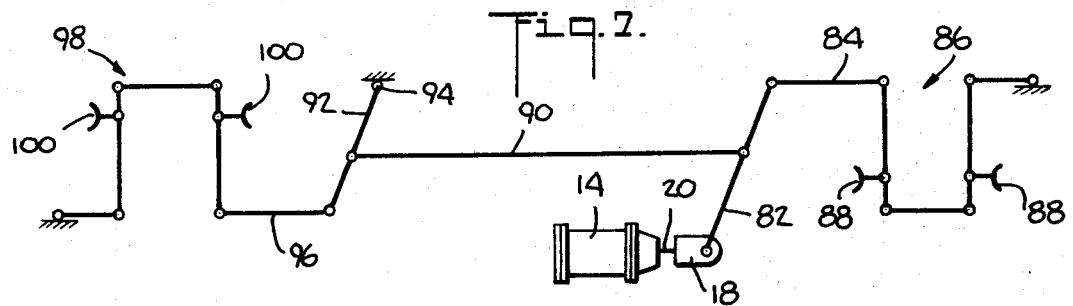
FIGS. 7–10 are diagrammatic views showing the load compensating unit applied in various alternative locations in the brake rigging of typical railway cars.

In the embodiment of the invention illustrated in FIGS. 1–7 inclusive, a standard conventional type railway car is shown having a body or frame 10, FIG. 1, and a truck indicated generally at 12. There is an air piston and single diameter cylinder assembly 14 which is fixedly attached to the frame 10 as at 16, FIG. 1. A load compensating unit, indicated generally at 18, can be applied in any suitable location in the brake rigging as will be described more fully hereinafter. In the embodiment of FIGS. 1–6, the load compensating unit is mounted on a push rod 20 extending from the air piston and cylinder assembly 14. The unit transmits the full force generated by the air cylinder to the brake rigging when the car is loaded and regulates or controls the amount of force transmitted when the car is empty. An actuating cable assembly 22 has one end attached to the load compensating unit 18 at 24, and the other end thereof is attached to the side frame of the truck as at 26, FIG. 1, for purposes of actuating said load compensating unit responsive to the loading of the railway car.

As best seen in FIGS. 1 and 2, the railway truck 12 has a stationary truck side frame 28 and a truck bolster 30 mounted for vertical movement with the railway car body, the vertical position being responsive to the load carried by the railway car. A bracket 32, FIG. 2, is mounted on the truck side frame 28. The actuating cable assembly 22, includes an outer sheath 34 which encompasses a cable 36. One end of the cable 36 passes through the bracket 32 and is secured by means of a lock block 38. A cable guide 40 is mounted in an aperture in the truck bolster 30 in a position adjacent the bracket 32, and the end of the sheath 34 is mounted on the bottom thereof so that vertical movement of the truck bolster 30 with respect to the bracket 32 on the truck side frame 28 causes corresponding movement of the cable 36 with respect to the sheath 34. This movement is transmitted along the cable assembly 22 to the load compensating unit 18.

In some installations the railway car body may be subjected to sudden bumps or variations in movement. In order to prevent this sudden irregular movement from transmitting a "false" signal to the load compensating unit 18 means are employed for damping out such sudden irregular movements, but allowing the true signal indicating the vehicle loading to reach the load compensating unit. In one form of our invention a snubber or spring assembly unit, indicated generally at 42, FIG. 2, may interconnect lengths of the actuating cable assembly 22. The spring assembly unit 42 includes a spring 44 and a housing 46. The spring serves to take care of vibrations of the railway car.

As best seen in FIG. 3, the load compensating unit 18 comprises a U-shaped housing 48 with a rear cover plate 50, a front cover plate 52 having housing jaws 53 depending therefrom for installation in a brake rigging of a railway car, and a bottom cover 54 which serves to close the bottom portion of the housing 48. The push rod 20 passes through an opening 56 in the rear cover plate 50 and is threadably attached to a push rod abutment 58. Other suitable means of attachment may be employed, if desired. A unit spring 60 is mounted in the housing for acting between the push rod abutment 58 and the front cover plate 52 to urge the piston rod 20 to the left as viewed in FIGS. 4 and 5. As best seen in FIG. 6, a pivot pin 62 is mounted transversely of the housing 48 and a pawl 64 is fixedly mounted thereon, as by means of a pawl pin 66 provided for the purpose. As seen in FIG. 4, the pawl is engageable with the push rod abutment 58 as at 67 for preventing movement of the push rod to the right as viewed in FIG. 4. A pawl spring 68 is mounted on the pivot pin 62 for engaging the bottom cover 54 at 70 and a pawl at 72 to urge said pawl to rotate from its position as seen in FIG. 4 to its position as seen in FIG. 5.

Still referring to FIGS. 3–6, a trigger 74 is fixedly mounted on the pivot pin 62 by means of a trigger pin 76. A cable guide bracket 78 is mounted on the bottom cover 54 and one end of the cable 36 passes therethrough and is secured by means of a set screw 80 to the trigger 74. The end of the sheath 34 is mounted on the cable guide bracket 78 so that movement of the cable 36 with respect to the sheath 34 causes corresponding movement of the trigger 74. Accordingly, as the cable 36 moves back and forth corresponding to the vertical position of the railway car, the trigger rotates the pivot pin 62, and thereby moves the pawl 64 into or out of engagement with the push rod abutment 58, FIGS. 4 and 5.

In all brake applications pressure is developed in the air cylinder and transmitted to the brake rigging through the load compensating unit. The load compensating spring 60, FIGS. 4–6, is located between the air cylinder which is a source of power and the brake rigging, which is a resistance. The power source pushes against the spring and the spring pushes against the resistance. By selecting a spring which compresses a predetermined amount from a predetermined pressure, the amount of pressure transmitted from the air cylinder to the brake rigging is controlled. The spring 60 is mounted in the housing 48 with a certain amount of pre-compression. The spring is designed to produce the maximum or optimum braking force desired for an empty car without sliding the wheels.

In operation, when the railway car is empty or lightly loaded, the bracket 32, FIG. 2, and the cable guide 40 are relatively close together, thereby releasing the tension on the cable 36 so that the pawl spring 68, FIGS. 3–6, rotates the pawl 64 to its disengaged position as seen in FIG. 5. When the brakes are applied, air is supplied to the air cylinder 14, FIG. 2, thereby extending the push rod 20 which, in turn, compresses the spring 60, FIGS. 3–6. The force exerted on or going into the brake rigging, is the force on the compressed spring pushing against the resistance of the brake rigging, and therefore the amount of spring compression, as determined by the amount of brake application by the air cylinder, determines the braking force developed. Light or moderate application slightly compresses the spring, whereas emergency brake application compresses the spring to a substantially greater extent. Nevertheless, the spring force determines the maximum force applied to the brake rigging. Upon release of the braking application or air cylinder pressure, the spring 60 urges the push rod 20 to its position as seen in FIG. 4 and thereby releases the braking force.

In operation, when the railway car is fully or substantially loaded, the truck bolster 30, FIG. 2, and hence the sheath 34, move downwardly, the cable 36 is tensioned and rotates the pivot pin 62 by means of the trigger 74, FIG. 4. This rotates the pawl 64 to its position of engagement with the push rod abutment 58, as seen in FIG. 4. In effect, this provides a solid or rigid connection extending from the air cylinder 14 through the load compensating unit 18 to the brake rigging. The force that the air cylinder develops is transmitted directly to the brake rigging.

FIGS. 7–10 illustrate diagrammatically conventional brake rigging arrangements. The load compensating units 18 can be located in various suitable locations in the brake rigging. In FIG. 7 the load compensating unit 18 is connected to the push rod 20 extending from the air cylinder 14 and a live lever 82 has one end pivotally connected to the other end of the unit 18. A first pull rod 84 is pivotally connected at the other end of the live lever and a first brake shoe mechanism, indicated generally at 86, is connected to the other end of the pull rod 84.

The brake shoe mechanism includes brake shoes 88 which are mounted in operative relationship to the periphery of the wheels (not shown) on one truck of the railway car. One end of a center rod 90 connects the center of the live lever 82 to the center of a dead fulcrum lever 92. The dead fulcrum lever has one end pivotally attached, as at 94, to the car body and the other end thereof is connected to a pull rod 96. A second brake shoe mechanism, indicated generally at 98, is connected to the other end of the pull rod 96. The brake shoe mechanism includes brake shoes 100 which are mounted in operative relationship to the periphery of the wheels (not shown) on the other truck of the railway car.

Figure 8:
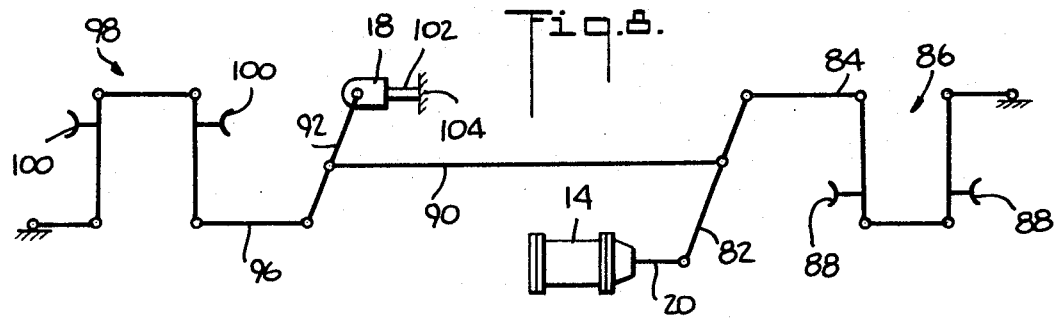

In the embodiment of FIG. 8, the load compensating unit 18 is connected to one end of the dead lever 92 and serves as a fulcrum. A push rod 102 extends from the unit and is anchored to the car body, as at 104. The compensating unit 18 and the push rod 102 function in the same manner as the push rod 20 and compensating unit 18 of FIGS. 1–7 described hereinbefore in connection with the embodiment of FIG. 7.

Figure 9:
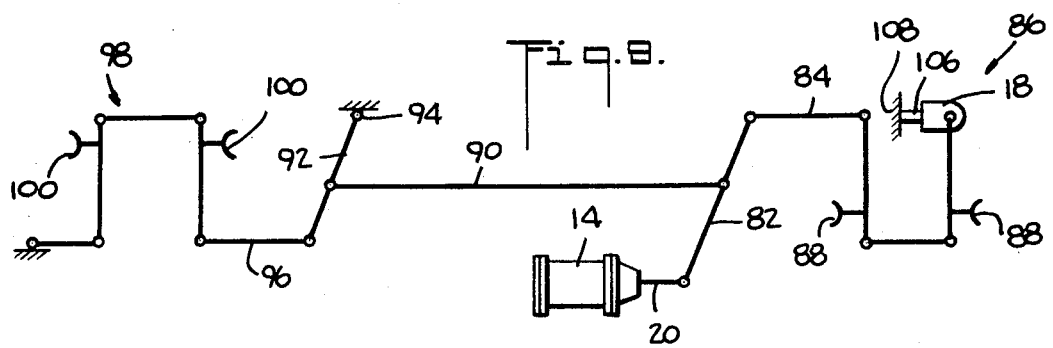

In the embodiment of FIG. 9, the load compensating unit 18 is connected to the end of the first brake shoe mechanism and serves as a fulcrum. A push rod 106 extends from the unit and is anchored to the car body at 108. The load compensating unit of FIG. 9 functions in the same manner as it does in the embodiment of FIGS. 7 and 8, described hereinbefore.

Figure 10:
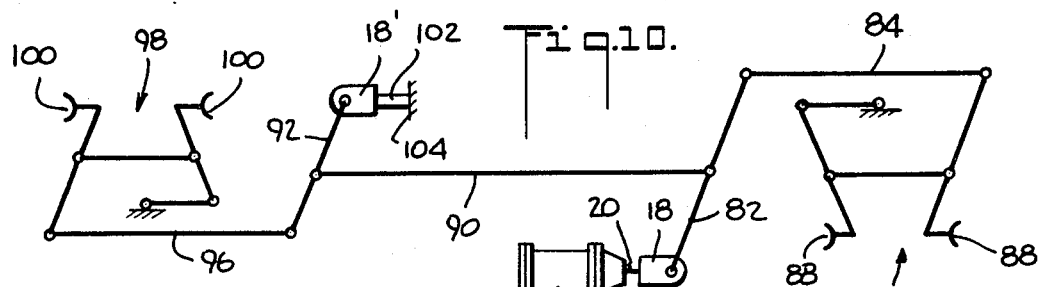

In the embodiment of FIG. 10, two load compensating units 18 and 18' are used on one railway car. In this embodiment one unit 18 is connected to the push rod 20 extending from the air cylinder 18 and the other load compensating unit 18' is connected to one end of the dead lever 92 and serves as a fulcrum. The push rod 102 extends from the unit and is anchored to the car body at 104. The load compensating units 18 and 18' are identical except that one unit has a lighter unit spring 60 with respect to the other. The pawls in both units are moved into or out of engagement with their piston rod abutments by means of the actuating cable assemblies, respectively. The actuating cable associated with the load compensating unit having the light spring is adjusted to lock its load compensating unit when the railway car is partially loaded, such as about 30 percent of full car loading, for example. The actuating cable associated with the other load compensating unit is adjusted to lock its load compensating unit when the railway car is about 50 percent loaded, for example. When the railway car is empty, both load compensating units are unlocked and when the brakes are applied the unit with the lightest capacity spring compresses while the spring in the other unit remains extended. As the car is partially loaded, i.e., to about 30 percent, for example, the unit with the light spring locks, while the other unit remains free. Under this condition, as the brakes are applied, the unit with the light spring acts as a solid rod and the braking force operates through the higher capacity spring which results in a higher braking force being delivered to the braking shoes. As more load is applied to the railway car, such as about 50 percent of the full capacity of the car, for example, the second unit also locks which, in effect, gives a condition of having a solid connection through the brake rigging and results in full braking power being developed. It will be appreciated that additional load compensating units may be employed if additional steps or stages of brake application are desired.

Figure 11:
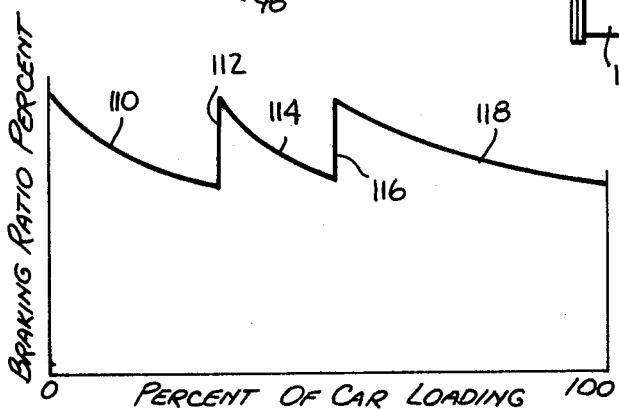
FIG. 11 is a graph showing the relationship between the braking ratio percent with respect to the percent of car loading.

Referring to FIG. 11, there is illustrated a typical braking ratio curve for the braking apparatus as described in the embodiment of FIG. 10. It is noted that the portion of the curve designated at 110, shows the braking ration when the railway car is partially loaded and the brakes are applied. In this position, the light spring is working. A changeover line, as indicated at 12, is shown at about 30 percent of full car loading for illustration purposes. Actually, this line could be moved to a slightly higher or lower rating, as desired. A portion 114 of the curve above the changeover line shows the braking ratio when the railway car has an additional load and the unit when the light spring is lock while the heavy spring in the other unit is working. A second changeover line, indicated at 116, is shown at about 50 percent of full carloading for illustration purposes. This line could be moved to a higher or a lower rating, if desired. A portion 118 of the curve above the second changeover line shows the braking ratio when the railway car is substantially loaded. In this position both load compensating units are locked, resulting in full braking power being developed. It will be appreciated that such an operating curve can readily be designed to fall within the operating ranges set forth by the Association of American Railroads even for very large railway cars which have a very large range between empty and full loads.

Referring next to FIGS. 12–15, there is illustrated another embodiment of our invention wherein a standard conventional type railway car is shown having a body or frame 120, FIGS. 12, and a truck indicated generally at 122. A load compensating unit indicated generally at 124 is installed in the brake rigging to operate in tension. When the car is loaded the unit acts as a solid connection through the brake rigging and results in full braking power being developed, and when the car is empty the unit is unlocked and the braking force is determined by the unit spring, as will be discussed more fully hereinafter. An actuating cable assembly 126 interconnects the load compensating unit 124 and the side frame of a railway truck, as at 128, FIG. 12, for purposes of actuating the load compensating unit responsive to the loading of the railway car. The railway truck 122 has a stationary truck side frame 130 and a truck bolster 132 mounted for vertical movement of the car body, the vertical position being responsive to the load carried by the car. A bracket 134, FIG. 13, is mounted on the truck side frame 130. Said actuating cable assembly 126 comprises an outer sheath which encompasses a cable 138 having one end connected to the bracket 134 as by means of a lock block 140. One end of the sheath 136 is connected to the truck bolster 132, as at 142, so that vertical movement of the truck bolster with respect to the bracket 134 on the truck side frame 130 causes corresponding movement of the cable 138 with respect to the sheath 136. The other end of the sheath 136 is connected to the car body at 144, and the other end of the cable 138 is connected to a rod 146, as at 148. The rod is connected to a snubber or spring assembly unit 150 which is constructed and functions in the same manner as the unit 42, FIG. 2. A second cable assembly indicated generally at 152 connects the spring unit 150 to the load compensating unit 124.

Figure 14:
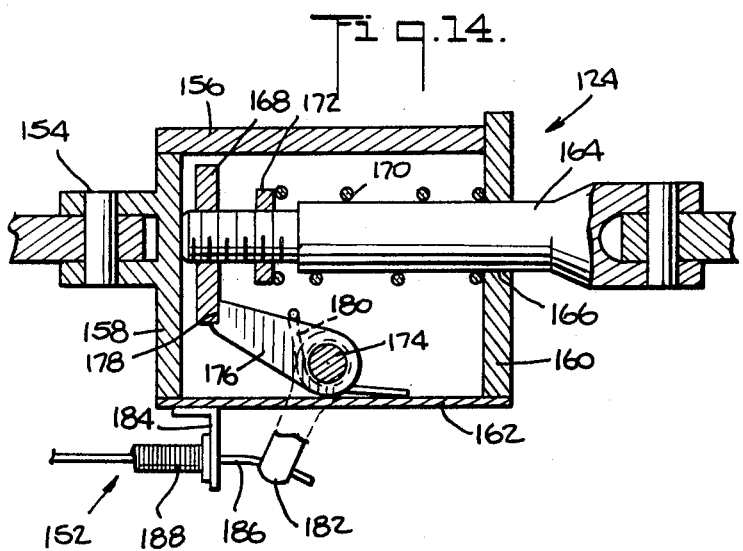
FIG. 14 is a vertical, medial, sectional view of another embodiment of a load compensating unit constructed according to the concepts of our invention.
Figure 15:
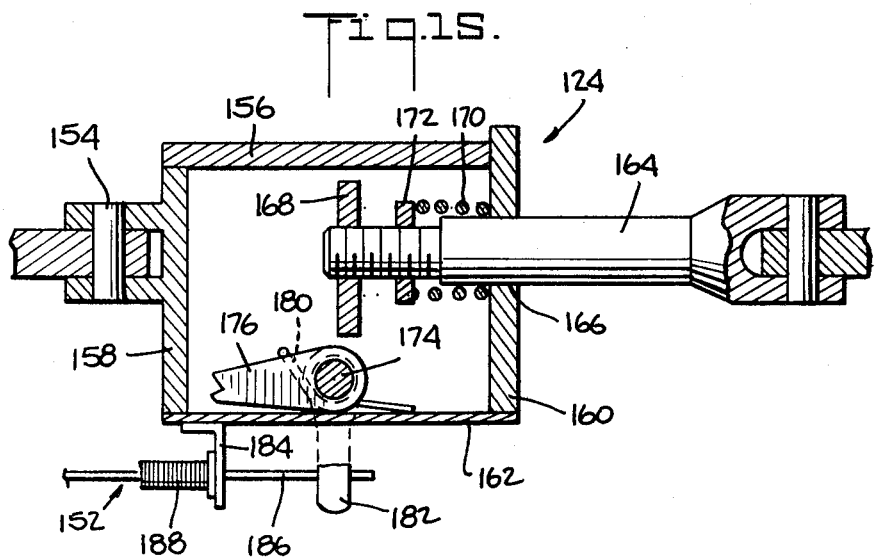
FIG. 15 is a vertical, medial, sectional view of the load compensating unit similar to FIG. 12, but showing the unit in a second operative position.

As seen in FIGS. 14 and 15, the load compensating unit 124 is mounted on the car body as at 154 and comprises a U-shaped housing 156 with a rear cover plate 158. A front cover plate 160 is mounted on the other end of the housing and a bottom cover 162 serves to close the bottom of the housing. A pull rod 164 passes through an opening 166 in the front cover plate 160 and is threadably attached to a pull rod abutment 168. Other suitable means of attachment may be employed, if desired. A unit spring 170 is mounted in the housing for acting between a spring control nut 172 and the front cover plate 166 to urge the pull rod 164 to the left, as viewed in FIG. 14. Adjustment of the position of the spring control nut serves to increase or decrease the spring force, as desired.

Still referring to FIGS. 14 and 15, a pivot pin 174 is mounted transversely of the housing 156 and a pawl 176 is fixedly mounted thereon. The pawl is engageable with the pull rod abutment 168, as at 178, FIG. 14, for preventing movement of the pull rod to the right as viewed in FIG. 14. A pawl spring 180 is mounted on the pivot pin 174 for engaging the bottom cover 162 and the pawl to urge the pawl to rotate from its position as seen FIG. 14 to its position as seen in FIG. 15. A trigger 182 is fixedly mounted on the pivot pin 174 and a cable guide bracket 184 is mounted on the bottom cover 162. The second cable assembly 152 includes a cable 186 which passes through the bracket 184 and is secured to the trigger 182, and a sheath 186 which is mounted on the bracket 184, so that movement of the cable 186 with respect to the sheath 188 causes corresponding movement of the trigger 182. Accordingly, as the cable 138, rod 146, snubber 150, (FIG. 13) and cable 186, (FIGS. 15 and 16) move back and forth corresponding to the vertical position of the railway car, the trigger rotates the pivot pin 174 and thereby moves the pawl 176 into or out of engagement with the pull rod abutment 168.

In operation when the railway car is empty or lightly loaded, the tension on the cable 186 is released so that the pawl spring 180 rotates the pawl 176 to its disengaged position, as seen in FIG. 15. When the brakes are applied, the brake rigging pulls on the pull rod 164 which, in turn, compresses the spring 170, FIG. 15. The force exerted on the brake rigging is the force in the compressed spring pushing against the resistance of the brake rigging and therefore the amount of spring compression controls the braking force developed. Upon release of the brake application or air cylinder pressure, the spring 170 urges the pull rod 164 to its position as seen in FIG. 14, thereby releasing the braking force.

In operation when the railway car is loaded, the cable 186 is tensioned and hence rotates the pivot pin 174 by means of the trigger 182, thereby rotating the pawl 176 to its position of engagement with the pull rod abutment 168, as seen in FIG. 14. In effect, this provides a solid or rigid connection extending through the unit.

As seen in FIG. 12, the pull rod 164 is pivotally connected to one end of a dead lever 188. A center rod 190 is connected to the middle of the dead lever and extends to the other truck of the railway car. The other end of the dead lever 188 is connected to a pull rod 192 which, in turn, is connected to a brake shoe mechanism, indicated generally at 194.

Figure 16:
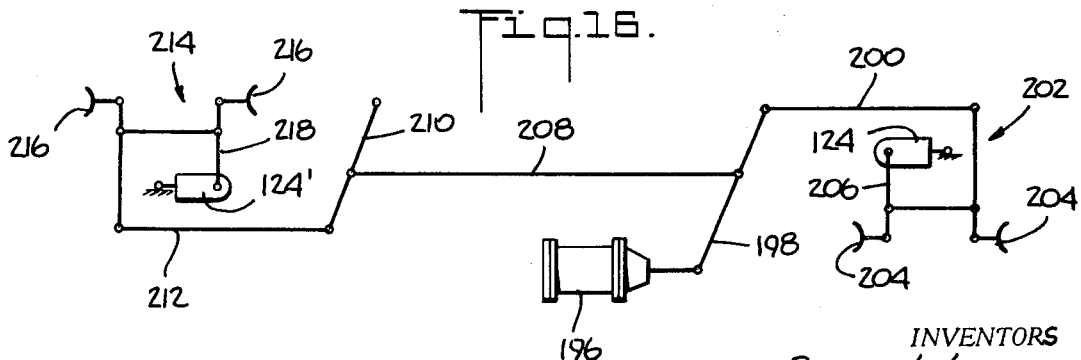
FIG. 16 is a diagrammatic view showing the load compensating unit applied in the brake rigging of a typical railway car.

It will be appreciated that the load compensating unit 124 can be located in any suitable location in the brake rigging, or a plurality of units may be employed at several locations in the brake rigging. FIG. 16 illustrates the use of two units 124 and 124' which have two different spring pressures.

In this application, an air cylinder 196 is connected to one end of a live lever 198 and the other end of the live lever is connected to a pull rod 200 which is connected to a brake shoe mechanism indicated generally at 202 and includes brake shoes 204 and a dead lever 206. A center rod 208 connects the center of the live lever 198 to the center of a dead lever 210, and a pull rod 212 connects the dead lever 210 to a brake shoe mechanism indicated generally at 214, which includes brake shoes 216 and a dead lever 218. The units are applied to the truck dead levers 206 and 218 on both trucks of the railway car, respectively. When the car is empty both units are unlocked and when the brakes are applied the unit with the spring of the lightest capacity is the only one compressed. As the car is partially loaded, the unit with the light spring is locked, but not the unit with the higher spring capacity. Under this condition, as the brakes are applied, a higher braking force is realized, but still not the full braking force. When the car is fully loaded, the other unit is locked and full braking power is realized. That is, both units act like solid rods and full braking power is developed.

It will thus be seen that the present invention does indeed provide an improved braking system which is superior in simplicity and efficiency, as compared to prior art such devices.

Although certain particular embodiments of the invention are herein disclosed for purposes of explanation, various modifications thereof, after study of this specification, will be apparent to those skilled in the art to which the invention pertains.

What is claimed and desired to be secured by letters patent is:

1. Braking apparatus for a railway car having a stationary truck side frame, a truck bolster mounted for vertical movement, the vertical position being responsive to the load carried by said railway car, brakes, and brake rigging for actuating such brakes including force applying piston and cylinder means, a plurality of lever means intermediate said piston and cylinder means and said brakes and movable by the latter means for transmitting the force of said piston and cylinder means to said brakes, means for interconnecting said lever means and means for mounting at least one of said lever means, said apparatus comprising a load compensating unit mounted in said brake rigging for controlling the movement of at least one of said levers and the force transmitted by said levers to said brakes, said load compensating unit including a housing and a rod which are movable relative to each other, one of said housing and said rod being connected to one of said lever means for movement therewith upon said actuation of said brakes and the other of said housing and said rod being connected to one of said means other than said last-mentioned lever means, spring means interposed between said housing and said rod to transmit force from said housing to said rod and vice versa upon relative movement between said rod and said housing with movement of said last-mentioned lever means, and means controlled by the vertical position of said bolster for locking said rod with respect to said housing when said railway car is substantially loaded to thereby bypass said spring and transmit force between said housing and said rod through said locking means.

2. Apparatus according to claim 1 wherein said rod has an end which extends inside said housing and has an abutment mounted thereon, and wherein said spring means is a spring acting between said abutment and said housing, and wherein said means for locking said rod comprises a panel mounted inside said casing, and means for pivoting said pawl into engagement with said abutment for locking said rod with respect to said housing when said railway car is substantially loaded.

3. Apparatus according to claim 2 further comprising means mounted towards the end of said rod for adjusting the compression of said spring.

4. Apparatus according to claim 2 further comprising a second load compensating unit mounted in said brake rigging, and wherein the spring of said second unit has a lighter spring force with respect to the spring of the first unit.

5. Apparatus according to claim 2 wherein said load compensating unit is mounted in tension in said brake rigging.

6. Apparatus according to claim 2 wherein said load compensating unit is mounted in compression in said brake rigging.

7. Apparatus according to claim 2 wherein said means for pivoting said pawl into engagement with said abutment comprises cable means interposed between said pawl and said truck bolster.

8. Apparatus according to claim 2 wherein said means for pivoting said pawl into engagement with said abutment comprises a pivot pin mounted on the inside of said housing, said pawl being fixedly mounted on said pivot pin, a trigger being fixedly mounted on said pivot pin and extending outwardly of said housing, and cable means interposed between said trigger and said truck bolster.

9. Apparatus according to claim 8 wherein said cable means comprises a cable mounted in a sheath, one end of said cable being attached to said trigger and the adjacent end of said sheath being attached to said housing, the other end of said cable being attached to said truck side frame and the other end of said sheath being attached to said truck bolster whereby vertical movement of said truck bolster with respect to said truck side frame causes responsive movement of said trigger.

10. Apparatus according to claim 9 further comprising a spring assembly unit interconnecting lengths of the cable, said spring assembly having a spring which dampens out vibrations of the railway car.

11. Apparatus according to claim 10 further comprising a rod interconnecting said spring assembly unit and a portion of said cable.

12. Braking apparatus for a railway car having a stationary truck side frame, a truck bolster mounted for vertical movement, the vertical position being responsive to the load carried by said railway car, said apparatus comprising brake rigging, a load compensating unit mounted in said brake rigging, said load compensating unit including a U-shaped housing, a rear cover plate mounted on said housing, a front cover plate mounted on said housing, a bottom cover serving to close the bottom portion of said housing, a rod passing through an opening in said rear cover plate, a rod abutment threadably attached to the portion of said rod extending through said cover plate, a unit spring mounted in said housing for acting between said rod abutment and the front cover plate to urge said rod outwardly of said housing, a pivot pin mounted transversely of said housing, a pawl fixedly mounted on said pivot pin, said pawl being engageable with said rod abutment for preventing movement of said rod, a pawl spring mounted on said pivot pin for urging said pawl out of engagement with said rod abutment, a trigger fixedly mounted on said pivot pin, a cable mounted in a sheath, one end of said cable being attached to said trigger and the adjacent end of said sheath being attached to said housing, the other end of said cable being attached to said truck side frame and the other end of said sheath being attached to said truck bolster whereby vertical movement of said truck side frame causes responsive movement of said trigger.

13. Braking apparatus for a railway car having a stationary truck side frame, a truck bolster mounted for vertical movement, the vertical position being responsive to the load carried by said railway car, said apparatus comprising brake rigging, a load compensating unit mounted in said brake rigging, an air cylinder, a piston push rod extending from the air cylinder, a live lever having one end pivotally connected to said load compensating unit, a first pull rod pivotally connected to the other end of the live lever and a first brake shoe mechanism connected to the other end of the pull rod, one end of a center rod connected to the central portion of the live lever, a dead fulcrum lever, the other end of the center rod being connected to a central portion of the dead fulcrum lever, said dead fulcrum lever having one end attached to the car body, a second pull rod having one end connected to the other end of the dead fulcrum lever, and a second brake shoe mechanism connected to the other end of said second pull rod, said load compensating unit including a U-shaped housing, a rear cover plate mounted on said housing, a front cover plate mounted on said housing, a bottom cover serving to close the bottom portion of said housing, a push rod having one end connected to said piston push rod and the other end passing through an opening in said rear cover plate, a push rod abutment threadably attached to the portion of said push rod extending through said cover plate, a unit spring mounted in said housing for acting between said push rod abutment and the front cover plate to urge said push rod outwardly of said housing, a pivot pin mounted transversely of said housing, a pawl fixedly mounted on said pivot pin, said pawl being engageable with said push rod abutment for preventing movement of said push rod, a pawl spring mounted on said pivot pin for urging said pawl out of engagement with said rod abutment, a trigger fixedly mounted on said pivot pin, a cable mounted in a sheath, one end of said cable being attached to said trigger and the adjacent end of said sheath being attached to said housing, the other end of said cable being attached to said truck side frame and the other end of said sheath being attached to said truck bolster whereby vertical movement of said truck bolster with respect to said truck side frame causes responsive movement of said trigger.

14. Braking apparatus for a railway car having a frame, brakes and brake rigging for actuating said brakes, said apparatus comprising load responsive means responsive to the load on said car and a load compensating unit for applying a predetermined braking force to said brakes when said car has a predetermined load thereon and for applying a lower braking force to said brakes when said car has a lesser load thereon, said unit comprising first and second members in sliding relation to each other, said first member being connected to said brake rigging, spring means in series with said second member and normally compressible by the latter upon actuation of said brakes, and locking means connected to and controlled by said load responsive means for engaging and opposing movement of said second member when the load on said car reaches said predetermined load and for thereby preventing compression of said spring means by said second member.

15. Braking apparatus as set forth in claim 14, wherein one of said members is a housing, the other of said members is a rod having a portion thereof within said housing and slidable with respect to the latter and said locking means is a pawl engageable with said second member for limiting movement thereof with respect to said spring means.

16. Load compensating braking apparatus for a railway car having a pair of members mounted for movement relative to each other with loading of the car, the relative positions of said members being dependent upon the load carried by the car, brakes, brake rigging for actuating said brakes and combined piston and cylinder members for actuating said rigging, said apparatus comprising load responsive means controlled in accordance with said relative positions, and a load compensating unit mounted in said rigging to control the movement thereof upon actuation of said brakes by said piston and cylinder members, said unit comprising a housing member, a rod member mounted in sliding relation to said housing member with a portion thereof in said housing member, compressible spring means in said housing member intermediate the latter and said rod member for compression therebetween upon actuation of said brakes, means connecting one of said housing and rod members to a portion of said rigging, means connecting the other of said housing and rod members to one of said pair of and said piston and cylinder members, and locking means controlled by said load responsive means for limiting relative movement between said housing and rod members and thereby limiting compression of said spring means.

* * * * *